United States Patent [19]

Weber

[11] Patent Number: 5,360,551
[45] Date of Patent: Nov. 1, 1994

[54] PROCESS FOR COLOR REDUCTION OF DYE WASTEWATER

[75] Inventor: Oscar W. Weber, Reading, Pa.

[73] Assignee: Crompton & Knowles Corporation, Stamford, Conn.

[21] Appl. No.: 40,470

[22] Filed: Apr. 1, 1993

[51] Int. Cl.⁵ ............................................... C02F 1/56
[52] U.S. Cl. ............................... 210/719; 210/725; 210/727; 210/728; 210/735; 210/736; 210/917
[58] Field of Search ............... 210/719, 725, 727, 728, 210/735, 736, 917

[56] References Cited

U.S. PATENT DOCUMENTS

| | | | |
|---|---|---|---|
| 2,877,177 | 3/1959 | Story | 210/917 |
| 3,947,248 | 3/1976 | Powers | 210/735 |
| 3,969,239 | 7/1976 | Shinohara et al. | 210/735 |
| 4,005,011 | 1/1977 | Sweeny | 210/631 |
| 4,088,573 | 5/1978 | Nakajima et al. | 210/727 |
| 4,137,163 | 1/1979 | Young | 210/705 |
| 4,194,973 | 3/1980 | Smith | 210/719 |
| 4,415,467 | 11/1983 | Piepho | 252/181 |
| 4,425,238 | 1/1984 | Degen et al. | 210/917 |
| 4,668,404 | 5/1987 | Walterick | 210/917 |
| 4,695,386 | 9/1987 | Berry | 210/665 |
| 4,705,639 | 11/1987 | Aldrich | 210/720 |
| 4,724,045 | 2/1988 | Ackel | 210/710 |
| 4,895,662 | 1/1990 | Stevens | 210/692 |
| 5,071,587 | 12/1991 | Perman | 252/181 |
| 5,122,279 | 6/1992 | Guess | 210/719 |
| 5,200,089 | 4/1993 | Siefert | 210/917 |

FOREIGN PATENT DOCUMENTS

| | | |
|---|---|---|
| 50-147156 | 11/1975 | Japan. |
| 54-28452 | 3/1979 | Japan ................... 210/917 |

*Primary Examiner*—Peter A. Hruskoci
*Attorney, Agent, or Firm*—Bernard F. Crowe

[57] ABSTRACT

A highly colored dye wastewater is treated by a sequence of steps to obtain a color reduction of 90 percent or more. The method requires acidifying the wastewater and adding a cationic flocculant. A reducing agent is then, optionally, added to further reduce the color value of the wastewater and produce an oxidation-reduction potential of at least −200 and, generally, about −400 to −800. The reducing agent is, preferably, either a hydrosulfite or both a bisulfite and an alkali metal borohydride.

40 Claims, No Drawings

PROCESS FOR COLOR REDUCTION OF DYE WASTEWATER

BACKGROUND OF THE INVENTION

1. Field Of The Invention

This invention relates to a process for reducing the color value of dye wastewater. More particularly, the invention relates to a process for removing dye bodies from wastewater and for converting the dye bodies into less chromophoric forms

2. Description Of The Related Art

Wastewaters from pulp and paper process effluents and from textile dyeing process effluents presents substantial environmental problems because such wastewaters contain substantial concentrations of "color bodies". For example, textile mills can generate millions of gallons of dye wastewater every day. Such wastewater contain colloidal bodies and suspended solids containing color compounds. Color compounds or "color bodies" can include dyes and/or dye by-products. Wastewater streams, that contains these dyes and/or dye by-products, often do not meet regulatory standards for wastewater discharge even after they have undergone treatment by a conventional process.

Various processes have been utilized to remove the colored colloidal bodies and colored suspended solids (hereinafter collectively referred to as "color bodies") and to reduce their associated high biochemical oxygen demand. One wastewater treatment process involves adding substantial quantities of lime to the wastewater from which pulp fibers and ligneous matter have been separated. The lime flocculates the color bodies and, thereby, reduces the initial color of the wastewater by 80 to 90 percent and significantly reduces the biochemical oxygen demand. This process has a significant disadvantage in that it requires high capital and operating expenditures. In addition, such wastewater treatment processes do not recover the pulp or ligneous material collected by the process. Finally, the quantities of lime employed by this process cause significant problems in lime handling, sludge removal, pH, and environmental quality of the wastewater that is ultimately released from the process.

Other processes for removing color bodies include treating the wastewater from a paper and textile dyeing process with lime and ferrous sulfate. This treatment is effective for separating a portion of the color bodies from the wastewater. However, dilution of the treated wastewater or a change in its pH releases the dye back into solution.

Some wastewater treatment processes pass the wastewater through an ion exchange resin to adsorb the lignins and their derivatives. Ion exchange resins, that are used for these purposes, generally comprise significantly cross-linked hydrophilic acrylic copolymers. These cross-linked hydrophilic acrylic copolymers adsorb the organic components by means of Van der Waals' forces. One of the primary disadvantages of the ion exchange processes is that the resin removes free chloride ions as well as the color bodies. When the ion exchange resin is regenerated, the released chloride ions increase in concentration in the system to undesirable levels. Ion exchange processes are, also, expensive when compared to other processes.

The degree of color in wastewater can be measured in "color units" as determined by a test process established by the American Public Health Association. This testing method measures the color content of water test samples by comparing the test samples to American Public Health Association color standards. The process uses colorimetric platinum-cobalt standards for measuring the "color value" of water that contains natural and synthetic compounds. The standard American Public Health Association color test process measures the color of a sample by visually comparing the test sample with the platinum-cobalt standards. One unit of color is defined as the amount of color that is produced by 1 milligram per liter (mg/1) of platinum in the form of chloroplatinate ion.

The American Public Health Association color test uses 50 milliliter (ml) "tall form" Nessler tubes. A standard chloroplatinate solution is prepared by dissolving 1,246 grams of potassium chloroplatinate ($K_2PtCl_6$), which is equivalent to 0.5 gram of metallic platinum, and 1 gram of crystalline cobaltous chloride ($CoCl_2 \cdot H_2O$) in distilled water containing 100 milliliters of concentrated hydrochloric acid (HCl). The solution is diluted to 1000 milliliters with distilled water. This standard solution is equivalent to 500 color units.

The standards used in the comparison test, are prepared in increments of 5 color units from 5 to 70 color units by dilution of the certified standard with known amounts of distilled water. The apparent color of the test sample is observed by filling a matched Nessler tube to the 50 milliliter mark with the test sample of water and comparing the test sample with the incremental standards. The comparison is made by looking vertically or downwardly through the tubes toward a white or specular surface placed at such an angle to the tubes that light is reflected upward through the columns of liquid in the tubes. When the color value exceeds 70 color units, the sample is diluted in known proportions with distilled water until the color value is within the range of the incremental standards. The measured color value is multiplied by the dilution factor to obtain the correct color value.

Very slight amounts of turbidity can interfere with the color value determination and, therefore, the samples showing visible turbidity are, desirably, clarified by filtration or centrifugation prior to the comparison of the test sample with the standards. If turbidity has not been removed by centrifuging or filtering, the color is recorded as "apparent color." When the turbidity has been removed by centrifuging or by other means, the color is recorded as "true color."

U.S. Pat. No. 4,088,573 to Nakajima discloses a process of clarifying wastewater containing acid dyes. The process involves contacting the wastewater with a dicyandiamide formaldehyde resin and sequentially adding at least 300 parts per million (ppm) of aluminum sulfate.

U.S. Pat. No. 3,947,248 to J. B. Powers discloses the use of cationic polymers to flocculate organic pigments in waste streams from polyester textile yarn and fabric manufacturing operations.

U.S. Pat. No. 3,969,239 to I. Shinohara et al. discloses a macroamine polymer as a high molecular weight flocculating agent in clarifying, precipitating, and decolorizing water. The polymer is used as the only flocculating agent in the treatment of wastewater to provide clarifying, precipitating, and decolorizing functions.

U.S. Pat. No. 4,005,011 to C. D. Sweeney discloses a process for the removal of color bodies in effluents from the manufacture of dyestuffs. The process treats the wastewater with lime to remove heavy metals. The wastewater is then clarified by carbon adsorption and subjected to a secondary biological treatment.

U.S. Pat. No. 4,724,045 to C. S. Ackel discloses a process for the decolorization of alkaline paper waste pulp. This process contacts the alkaline paper waste pulp with a strong mineral acid.

U.S. Pat. No. 5,071,587 to C. A. Perman discloses the removal of turbidity, metal contaminants, and organic contaminants from wastewater. The removal of these contaminants is accomplished by treating the water with tablets containing bentonite clay, attapulgite clay, polymeric coagulant, biocide, zeolite, and activated charcoal.

The above noted processes for treating colored wastewater containing large amounts of dyes have not been entirely successful. Many of the known processes, are not able to reduce the color of many wastewaters to acceptable levels for discharge to a public sewage stream. Other processes require additional treatments to adjust the pH to an acceptable range for discharge or require additional recovery steps to remove various components from the wastewater.

The invention provides a simple and efficient process for removing dyes or "color bodies" from aqueous wastewaters that are produced by dyeing or dye manufacturing operations. The invented process treats dye wastewater effluents or streams to provide an acceptable color value as established by agencies for regulating the discharge of the wastewater into a public sewage system.

SUMMARY OF THE INVENTION

The invention is a process for reducing a color value of a dye-containing wastewater or effluent, such as a wastewater stream. The process comprises adjusting the dye-containing wastewater to a pH of about 2.0 to about 6.9. The invention further involves admixing the wastewater with a cationic flocculant from a quaternary ammonium condensation polymer to form a floc and, optionally, admixing the wastewater with at least one reducing agent in a sufficient amount to attain an oxidation-reduction potential (often identified as "ORP") end point of at least −200, and preferably, an oxidation-reduction potential from −400 to −800.

The floc can, optionally, be separated by filtering or centrifuging. The invented process can be performed either as a batch process or as a continuous plant scale process for a wastewater.

DETAILED DESCRIPTION OF THE INVENTION

The present invention is a process for removing color bodies from many different varieties of dye wastewater. The process involves adjusting a pH of a dye-containing wastewater to about 2.0 to about 6.9 and, preferably, to a pH of about 4.0 to about 6.0. The process then requires admixing the effluent with a flocculating or coagulating agent followed by treating the coagulated effluent with a reducing agent.

The flocculating or coagulating agent, in preferred embodiments of the invention, is a quaternary ammonium condensation polymer of epichlorohydrin, dimethylamine, and ethylenediamine. A particularly preferred polymer for use with the invention is a polydiallyldimethyl ammonium chloride. The flocculating or coagulating agent separates color bodies from the effluent. The treated effluent can, optionally, be filtered to remove the flocced or coagulated color bodies. A reducing agent is then added to the wastewater in a sufficient amount to attain an oxidation-reduction potential end point of at least about −200 and, preferably, from about −400 to −800.

The reducing agent, in desirable embodiments of the invention, is an alkali metal hydrosulfite or a combination of an alkali metal bisulfite and an alkali metal borohydride. The alkali metal bisulfite and the alkali metal borohydride are added to the wastewater simultaneously or sequentially so as to produce alkali metal hydrosulfites in situ to provide further decolorization of the wastewater.

The process, according to the invention, has the advantage of effectively removing dye or dye-containing color bodies from wastewater so that a wastewater stream can be safely discharged into a public sewage system without the need for further treatment to reduce the color value or to adjust the pH of the wastewater. The process is able to remove the color bodies to a level that is not easily obtained by the other known methods.

The process, according to the most preferred embodiments of the invention, produces more consistent results in reducing the color value of a wastewater and in removing color bodies from dye-containing wastewater. These embodiments of the invention result in a color value reduction of at least about 90 percent and, preferably, at least about 95 percent compared with the initial color value of the untreated wastewater.

Wastewater, that is suitable for treatment by the process of the invention, is generally an intensely colored stream containing a mixture of organic dyes. Organic dyes, that are commonly found in such wastewater, are those dyes that are used in treating paper, in coloring textiles, and in other manufacturing processes. Dye-containing wastewater often includes a dye that is a member selected from the group consisting of azo dyes, acid dyes, indigo dyes, mordant dyes, reactive dyes, basic dyes, direct dyes, dispersed dyes, other comparable industrial dyes, and mixtures of these. The invention is particularly suitable for reducing the color value of wastewater containing azo dyes and other dyes having "double bond" chemical structures.

The color of the wastewater, treated by the process of the invention, can be measured by a modification of the American Public Health Association color test. A Taylor Color Comparator is used in this modification of testing for the color value. The Taylor Color Comparator is available from Taylor Chemicals Inc. of Sparks, Md. The 50 milliliter test sample of wastewater is prepared in the same manner as described above. The sample is passed through a millipore filter support with a 0.45 micron filter on a vacuum flask. A "long view sample tube" of the Taylor Color Comparator is filled with the filtered test sample of water and compared with the standard slides in the comparator. If the test sample is significantly colored, the sample of wastewater is diluted with distilled water in known proportions until the color value is in the range of the standard slides of the comparator. The measured color value is then multiplied by the dilution factor to obtain the actual American Public Health Association color value in "color units."

The color value of the initial wastewater, generally, has an American Public Health Association color value of about 100,000 to about 200,000 color units. Wastewater having an American Public Health Association color value of up to 400,000 color units can be effectively treated by the invented process. The process of the invention provides the treated wastewater with an American Public Health Association color value of less than 10,000 color units and, preferably, the color value is reduced to a range from about 2,000 color units to about 5,000 color units. The final color value of the wastewater, when it is treated by preferred embodiments of the invention, is less than 5,000 color units before discharge into the environment and, most preferably, is less than 3,500 color units.

The process of the invention requires the dye-containing wastewater to be acidified with a pH adjusting agent to a pH of about 2 to about 6.9 and, preferably, to a pH of about 4.0 to about 6.0. The acidification of the wastewater can be achieved by using a strong mineral acid. Suitable mineral acids include a member selected from the group consisting of phosphoric acid, sulfuric acid, hydrochloric acid, and mixtures of these. Sulfuric acid is the preferred pH adjusting agent because it is, generally, compatible with plant facilities and is inexpensive. The actual amount of a pH adjusting agent added to the wastewater depends on (1) the pH of the starting wastewater, (2) the presence of buffering agents in the wastewater, and (3) the pH required for the selected flocculant as further discussed below. Some of the components in the wastewater can precipitate as a result of the acidification of the wastewater. The degree of precipitation varies with the contents of the wastewater. The majority of the high molecular weight color bodies remain in solution after the wastewater is acidified. The acidified wastewater is then mixed with a cationic flocculating or coagulating agent. Suitable flocculating or coagulating agents for use with the invention produce a floc or coagulum in an acid environment.

A selected flocculating or coagulating agent is admixed with the acidified wastewater in a sufficient concentration to provide a color value reduction. A sufficient concentration of a flocculating or coagulating agent varies with the selected agent, but is up to, desirably, about 3000 parts per million in the wastewater and is, preferably, from about 50 to about 3000 parts per million in the wastewater. A more desirable concentration of the flocculating or coagulating agent is about 70 to 2000 parts per million in the wastewater. The most desirable concentration of the flocculating or coagulating agent is between about 1000 to 2000 parts per million or "about 1500 parts per million" in the wastewater.

The flocculating agent is, preferably, a cationic polymeric flocculant. Useful flocculants for use with this invention are described in U.S. Pat. No. 4,415,467, which is herein incorporated by reference.

A particularly preferred commercially available cationic polymeric flocculant is a polydiallyldimethyl ammonium chloride which has the formula $[(CH_3CHCH_2)_2N(CH_3)_2Cl]_x$. The value of "x" is, preferably, large enough to provide a polymer with a molecular weight of several thousand. Another example of a desirable commercially available polymer for use with the invention sold under the trade name METAFLOC 137 by Morton International. This polymer is a condensation product of epichlorohydrin, ethylenediamine, and dimethylamine.

In alternative embodiments of the invention, the polymeric flocculant can be a polydiallyldimethyl ammonium chloride which is commercially available and sold under the trade name CLARIFLOC C-308P by Polypure Inc. This flocculant is a light amber liquid and is completely soluble in water. It has a boiling point of 100° Celsius (hereinafter identified by the symbol "°C") a melting point of 0° C., a specific gravity of 1.03 to 1.05, and a pH of 5 to 7.

Another polydiallyldimethyl ammonium chloride flocculating or coagulating agent is commercially available and is sold under the trade name CLARIFLOC C-358P by Polypure Inc. This polymer is sold as an aqueous solution. It has the same formula as the CLARIFLOC C-308P product, but has a higher molecular weight. This flocculant is a light amber, clear viscous liquid and is cationic. This flocculant has a density of 8.7 pounds per gallon, a pH of 5 to 7, a flashpoint greater than 100° C., a specific gravity of 1.03 to 1.05, and complete solubility in water.

Another suitable flocculating or coagulating agent is a quaternary condensation polymer of epichlorohydrin and dimethylamine which has the formula $[(CH_3CHOHCH_2)N(CH_3)_2Cl]_x$. The value for "x" is preferably chosen so that the polymer has a molecular weight of several thousand. A suitable polymer of this type is known by the CAS number of "CAS 42751-79-1(polymer)." This polymer is commercially available from Polypure Inc. and is sold under the trade name CLARIFLOC C-319. This flocculant is sold as a clear amber-red, highly cationic, aqueous solution. This product has a density of 9.42 pounds per gallon, a pH of 6, a viscosity of 4,500 to 7,000 centipoise, a freezing point of −9° C., a melting point of 0° C., a boiling point of 100°C., a specific gravity of 1.13, and is completely soluble in water.

A product sold under the trade name ENERGECO 6303 by the Pro $H_2O$ Company is a suitable flocculating or coagulating agent.

Another suitable polymeric flocculating or coagulating agent is a highly charged cationic, quaternary ammonium, vinyl polymer. This compound is available from the Drew Industrial Division of Ashland Oil Inc. under the trade name AMERFLOC 482. The AMERFLOC 482 polymer is a clear to pale yellow liquid, has a specific gravity of 1.04 at 25° C., a viscosity of 120 centipoise at 25° C., a pH of 6, and a freezing point of −6° C.

A floc of color bodies is formed in a wastewater after the polymeric flocculating or coagulating agent is added to the wastewater and mixed by stirring or agitation. The floc can be removed by settling, filtering, centrifuging, or other suitable means for separating solids from liquids. A significant advantage of the process of the invention is that it is not necessary to separate the floc before adding a reducing agent. Since separation of the floc is difficult, time consuming, and expensive, the floc is not separated in preferred embodiments of the invention. Once the floc of color bodies are formed and, optionally, removed, the wastewater, typically, has an American Public Health Association color value of about 4,000 to 10,000 color units.

The process of this invention can sometimes be successfully performed with the admixing of only a cationic flocculant from a quaternary ammonium condensation polymer into an acidic dye wastewater. The addition of at least one reducing agent is usually required and can occur before, during, or after the admixing of the cationic flocculant into the dye wastewater. The admixing of the cationic flocculant into a dye wastewater before the addition of a reducing agent is economically desirable. The concentration of reducing agent, that is required to further lower the color value of the wastewater, is decreased by adding the more expensive reducing agent after the effective concentration of the less expensive cationic flocculant.

A reducing agent is then added to further reduce the color value of the wastewater to a level of color units that is low enough to permit discharge of the treated wastewater into a sewage system. In preferred embodiments of the invention, a reducing agent is either a member selected from the group consisting of an alkali metal hydrosulfite, an alkaline earth hydrosulfite, and mixtures of these or a combination of a member selected from the group consisting of an alkali metal bisulfite, an alkaline earth bisulfite, and mixtures of these with an alkali metal borohydride. The preferred reducing agents are sodium hydrosulfite or sodium bisulfite with sodium borohydride. Sodium hydrosulfite is also known as sodium dithionate. The addition of at least one of these reducing agents produces sulfur dioxide ($SO_2$) in situ to form sulfurous acid ($H_2SO_3$) or thiosulfuric acid ($H_2S_2O_4$) in solution. Sulfurous acid and thiosulfuric acid are effective in further reducing the color value of the wastewater.

The amount of the bisulfite or hydrosulfite added to the wastewater is, preferably, a sufficient amount to obtain a maximum color reduction. Generally, the most desirable concentration of bisulfite or hydrosulfite is up to about 5,500 parts per million and, preferably, about 1,500 parts per million in the wastewater.

Following the bisulfite addition, an alkali metal borohydride is added. The alkali metal borohydride is added in an amount sufficient to produce an oxidation-reduction potential (often identified as "ORP") of about −400 to −800 and an American Public Health Association color value of less than about 5,000 color units. The preferred alkali metal borohydrides are members selected from the group consisting of lithium borohydride, sodium borohydride, potassium borohydride, and mixtures of these.

The addition, according to the invention, of an alkali metal hydrosulfite or an alkaline earth hydrosulfite or of a combination of an alkali metal bisulfite or alkaline earth bisulfite with an alkali metal borohydride has been found to reduce the color value of most colored wastewater streams to a level not obtainable by use of a flocculant alone. The addition of the hydrosulfite or combination of the bisulfite and the borohydride results in an adjustment of the pH of a wastewater to about pH 6.0 to 9.0 which allows the wastewater to be discharged without further treatment. Generally, no further adjustment of the pH of a treated wastewater is necessary to discharge the wastewater after the hydrosulfite or combination of the bisulfite and the borohydride are added.

The borohydride is added to the wastewater in a sufficient amount to obtain an oxidation-reduction potential of at least −200. In preferred embodiments of the invention, the borohydride is added in an amount to produce a concentration of up to about 5,500 parts per million in the wastewater. Typically, the amount required to obtain the desired color reduction is about 1,500 parts per million in the wastewater.

The borohydride is added, in preferred embodiments of the invention, to the wastewater after the bisulfite. This sequence of admixing enables the process to use only the concentration of borohydride that is necessary to optimize the color reduction of a wastewater and to avoid the addition of unnecessary amounts of the borohydride which are not required for color reduction. The bisulfite compound can be added simultaneously with the borohydride in alternative embodiments of the invention.

The borohydride reacts with the bisulfite to produce hydrosulfite in situ. The hydrosulfite is believed to reduce the color of the wastewater by reacting with the double bonds of the chromatic compounds and, in particular, the azo linkages of organic dye compounds.

It has been surprisingly found that the order of addition of the components used in the invention significantly effects the amounts of the various components that are required by the process to reduce the color bodies. The most preferred embodiments of the invention, utilize an order of addition of components as follows. Initially a pH adjusting agent is added to the wastewater in sufficient concentration to lower the pH of the wastewater to about 4.0 to 6.9. Then, a flocculating agent is added in a sufficient concentration to form a floc. The addition of a hydrosulfite or combination of a bisulfite and borohydride compound in a sufficient concentration to reduce the color value of the wastewater follows. It has been found that this order of addition of components produces the most consistent results and provides the most economical treatment of a highly colored, dye-containing wastewater stream. This sequence of process steps can consistently reduce 90 to 95 percent of color value of a wastewater when compared with the initial color value of the wastewater.

It is readily appreciated that the order of addition of the components can be varied depending on the type of the wastewater to be treated. Factors which can influence the order of addition of components can include the types of dyes being treated, the intensity of the color bodies, the initial pH of the wastewater, and the volume of wastewater.

Other optional components are not, generally, needed, but can be added depending upon the characteristics of the wastewater. For example, for wastewaters having high turbidity, adsorbents can be added to clarify the wastewater. The adsorbents, such as zeolites and attapulgite clay, can be used in the form of a fine powder to provide a large surface area for rapid adsorption and precipitation of colloidal bodies. The use of an adsorbent contributes to the undesirable turbidity. However, it is not necessary to use large particles of adsorbent to avoid this turbidity. The coagulants and/or the flocculants used in the process can be selected to remove the fine particles of the adsorbent compound that are suspended in the water. Thus, fine particles of the adsorbent can be used which remain in suspension for enhanced adsorption during the purification process, but which are then removed along with contaminants or pollutants by causing the suspended particles to form aggregates or flocs which quickly separate from solution. Consequently, the average particle size of an adsorbent can be selected so as to form a suspension in the wastewater which can then be removed with the flocs. Other optional ingredients for use with the invention include silica gel, acidulant, buffer, sodium bicarbonate, binder, CaO, $Ca(OH)_2$, alumina, kaolin (kaolinitic clays or kaolinite), Fuller's earth, alum, sericitic clays, semitic clays, sodium dihydrogen phosphate ($NaH_2PO_4$), dibasic potassium phosphate ($KH_2PO_4$), natural ion exchange clays, montmorillonite, bleaching clays, activated charcoal, and diatomaceous earth.

The following non-limiting examples are intended to be exemplary of embodiments of the invention. It will be understood by those skilled in the art that other embodiments of the invention can be used without departing from the scope of the invention.

EXAMPLE I

A 500 milliliter sample of dye wastewater from a textile dye plant was obtained. The wastewater had a brown color and an initial American Public Health Association color value of 200,000 color units. The wastewater sample contained C.I. Direct Blue 160, C.I. Direct Black 179, C.I. Reactive Black 5, C.I. Direct Red 224, and water. The initial pH of the wastewater sample was pH 8.9 and was adjusted to pH 5.24 with 1.0 gram of sulfuric acid. Then, 1 gram of sodium metabisulfite ($Na_2S_2O_5$) was added to the wastewater sample. At this stage, the wastewater sample had a pH of 5.30.

Next, 3.3 grams of sodium borohydride, sold under the tradename VenMet, was added to the sample. The resulting wastewater sample had a pH of 8.05 and an oxidation-reduction potential of $-604$. After the wastewater sample was stirred, 1500 parts per million of a flocculant, sold under the trade name METAFLOC 137, was added to provide a concentration of 5 percent by weight solution. The flocculant-containing solution was prepared by diluting 5 milliliters of the commercial concentration of the METAFLOC 137 brand flocculant in 95 milliliters of water. The resulting 5 percent solution contained 50,000 parts per million of the METAFLOC 137 brand flocculant.

The sample of the treated wastewater produced a heavy foam upon the addition of the sodium borohydride. After the addition of the METAFLOC 137 brand flocculant, the sample had a American Public Health Association color value of 7000 color units. The wastewater sample was then filtered through a #4 Whatman filter paper.

The pH of the filtrate was adjusted with sodium hydroxide to produce a green precipitate indicating the presence of iron compounds. A METAFLOC 495 brand flocculant was then added, the sample was filtered, and the sample produced an American Public Health Association color value of 5000 color units which is about a 97.5 percent reduction in color value from the initial wastewater color value.

EXAMPLE II

A 500 milliliter sample of wastewater was collected having a dark brown color with a slight red tint. The sample contained C.I. Direct Blue 160, C.I. Direct Yellow 106, D&C Blue 2, and water. The sample had an initial American Public Health Association color value of 90,000 color units and a pH of 9.40.

The pH of the sample was adjusted to pH 5.4 by the addition of 0.6 gram of sulfuric acid ($H_2SO_4$). Then, 1 gram of sodium metabisulfite ($Na_2S_2O_5$) was added to produce a pH of 5.35 and an oxidation-reduction potential of $-106$. To the sample was then added 7.5 grams of sodium borohydride resulting in a pH of 10.2 and an oxidation-reduction potential of $-600$.

The pH of the wastewater sample was then adjusted to pH 8.45 with 0.6 gram of sulfuric acid ($H_2SO_4$). The wastewater sample at this stage had an oxidation-reduction potential of $-617$ and a American Public Health Association color value of 50,000 color units. Three aliquots containing 500 parts per million of METAFLOC 137 brand flocculant were sequentially added to the wastewater sample. Upon the addition of each aliquot, the American Public Health Association color value of the solution was 45,000 color units, 16,000 color units, and 12,000 color units, respectively.

Following the addition of the flocculant, 1 gram of sodium metabisulfite ($Na_2S_2O_5$) was added to the wastewater. The sample of the wastewater at this stage had a pH of 6.91 and oxidation-reduction potential of $-525$. Then, 3.0 grams of sodium borohydride were added and resulted in a pH of 8.54, an oxidation-reduction potential of $-658$, and an American Public Health Association color value of 8500 color units. Finally, an additional aliquot of 500 parts per million of METAFLOC 137 brand flocculant was added which produced an American Public Health Association color value of 7500 color units.

EXAMPLE III

A 1000 milliliter sample of dye wastewater containing water soluble azo dyes was initially filtered to clarify the sample. The sample was then poured into a 2 liter flask with a magnetic stirring bar. The wastewater sample contained a mixture of dyes including C.I. Direct Yellow 106, C.I. Direct Red 224, and Sulfanilic-Azo-Cresidine Base. The wastewater had an initial American Public Health Association color value of 45,000 color units.

The wastewater sample pH was lowered to a pH between pH 5 and pH 5.5 with sulfuric acid. Then 1000 parts per million of METAFLOC 137 brand flocculant was added which resulted in an American Public Health Association color value of 6,000 color units. The wastewater sample was then mixed with 2 grams of sodium metabisulfite followed by 2.2 grams of sodium borohydride and produced an oxidation-reduction potential reading of $-622$. The resulting treated sample was filtered through a #4 Whatman paper. The final American Public Health Association color value was 3500 color units.

EXAMPLE IV

A 1000 milliliter sample of a dye wastewater containing C.I. Direct Yellow 106, C.I. Direct Blue 160, C.I. Reactive Black 5, and C.I. Direct Black 179 was obtained for this example. The sample of wastewater had an initial American Public Health Association color value of 85,000 color units. The pH of the sample was adjusted to pH 5.4 with sulfuric acid followed by the addition of METAFLOC 137 brand flocculant to provide a 1500 parts per million concentration in the wastewater sample. The color value at this stage of the process was reduced to an American Public Health Association color value of 6500 color units. Then 2 grams of sodium metabisulfite were added to the wastewater followed by 2.9 grams of sodium borohydride. The sequential addition of the reducing agents produced an oxidation-reduction potential of $-601$. The final filtered wastewater sample had an American Public Health Association color value of 5000 color units.

EXAMPLE V

This example demonstrates the continuous plant scale use of the process of the invention. A dye wastewater stream had an American Public Health Association color value of 280,000 color units and contained C.I. Direct Black 179, FD+C Yellow #6, and water. For each 13,800 gallons of wastewater, 160 pounds of concentrated sulfuric acid was added to the wastewater stream to adjust the pH to 5.0. The acidified wastewater was then treated with METAFLOC 137 brand flocculant to produce a concentration of 1500 parts per million. Then, 800 pounds of a 38 percent aqueous solution of sodium bisulfite was added to the treated wastewater, followed by 17.8 gallons of a 12 percent sodium borohydride solution. The treated wastewater had a final American Public Health Association color value of 4400 color units.

The above examples demonstrate that, while the order of addition of the components can be altered to reduce the color value of a wastewater, the most consistent color reduction, with the minimum number of steps and the lowest amount of added reagent, occurs when the polymeric flocculant is added first, followed by the addition of the sodium metabisulfite and sodium borohydride.

I claim:

1. A process for reducing a color value of a wastewater containing a soluble organic dye, said process comprises:
adjusting said wastewater to an acidic pH; and
admixing said wastewater with a sufficient quantity of a cationic flocculant from a quaternary ammonium condensation polymer to form a floc with said soluble organic dye,
admixing a reducing agent into said flocculated wastewater in a amount sufficient to attain an oxidation-reduction potential end point of at least −200, said admixing of said reducing agent being performed in one of two conditions, said two condition being as follows:
a first condition wherein said reducing agent is a member selected from the group consisting of an alkali metal hydrosulfite, an alkaline earth hydrosulfite, and mixtures of these; and
a second condition wherein said reducing agent is a combination of:
a member selected from the group consisting of an alkali metal bisulfite, an alkaline earth bisulfite, and mixtures of these; and
an alkali metal borohydride, said alkali metal borohydride being a member selected from the group consisting of lithium borohydride, sodium borohydride, potassium borohydride, and mixtures of these; and
separating said flocculated soluble organic dye from said wastewater.

2. The process of claim 1, wherein said admixing of said reducing agent occurs before said admixing of said cationic flocculant.

3. The process of claim 1, wherein said admixing of said reducing agent occurs simultaneously with said admixing of said cationic flocculant.

4. The process of claim 1, wherein said admixing of said reducing agent occurs after said admixing of said cationic flocculant.

5. The process of claim 1, wherein said flocculant is a condensation product of epichlorohydrin, ethylenediamine, and dimethylamine.

6. The process of claim 1, wherein said adjusting of said pH of said wastewater provides a pH of about 5.0 to about 6.0.

7. The process of claim 1, wherein said flocculant is admixed in an amount to provide a concentration of about 50 to 3000 parts per million in said wastewater.

8. The process of claim 7, wherein said flocculant is admixed in an amount to provide a concentration of about 1000 to 2000 parts per million in said wastewater.

9. The process of claim 1, wherein said flocculant is a polydiallyldimethyl ammonium chloride.

10. The process of claim 1, wherein said alkali metal borohydride is added to said wastewater subsequent to admixing with said bisulfite.

11. The process of claim 1, wherein said reducing agent is sodium hydrosulfite.

12. The process of claim 1, wherein said reducing agent is a combination of sodium bisulfite and said alkali metal borohydride, said alkali metal borohydride is sodium borohydride.

13. The process of claim 1, wherein said flocculant and said reducing agent are added in sufficient amounts to reduce the color value of said wastewater at least 90 percent.

14. The process of claim 1, wherein said soluble organic dye is a member selected from the group consisting of azo dyes, acid dyes, indigo dyes, mordant dyes, reactive dyes, basic dyes, direct dyes, and combinations of these.

15. A process for reducing a color value of a wastewater containing a soluble organic dye, said process comprises:
adjusting said wastewater to an acidic pH;
admixing said wastewater with a sufficient quantity of a cationic flocculant from a quanternary ammonium condensation polymer to form a floc with said soluble organic dye;
admixing said flocculated wastewater with at least one reducing agent in a sufficient amount to attain an oxidation-reduction potential end point of −400 to −800 said admixing of said reduction agent being performed in one of two conditions, said two conditions being as follows:
a first condition wherein said reducing agent is a member selected from the group consisting of an alkali metal hydrosulfite, an alkaline earth hydrosulfite, and mixtures of these; and
a second condition wherein said reducing agent is a combination of:
a member selected from the group consisting of an alkali metal bisulfite, an alkaline earth bisulfite, and mixtures of these; and
an alkali metal borohydride, said alkali metal borohydride being a member selected from the group consisting of lithium borohydride, sodium borohydride, potassium borohydride, and mixtures of these; and
separating said flocculated soluble organic dye from said wastewater.

16. The process of claim 15, wherein said flocculant is a condensation product of epichlorohydrin, ethylenediamine, and dimethylamine.

17. The process of claim 15, wherein said adjusting of said pH of said wastewater provides a pH of about 2.0 to about pH 6.9.

18. The process of claim 17, wherein said adjusting of said pH of said wastewater provides a pH of about 5.0 to about pH 6.0.

19. The process of claim 15, wherein said flocculant is admixed in an amount to provide a concentration of about 50 to 3000 parts per million in said wastewater.

20. The process of claim 19, wherein said flocculant is admixed in an amount to provide a concentration of about 1000 to 2000 parts per million in said wastewater.

21. The process of claim 15, wherein said flocculant is a polydiallyldimethyl ammonium chloride.

22. The process of claim 15, wherein said alkali metal borohydride is added to said wastewater subsequent to said admixing with said bisulfite.

23. The process of claim 15, wherein said reducing agent is sodium hydrosulfite.

24. The process of claim 15, wherein said reducing agent is a combination of said sodium bisulfite and said alkali metal borohydride, said alkali metal borohydride is sodium borohydride.

25. The process of claim 15, wherein said flocculant and said reducing agent are added in sufficient amounts to reduce said color value of said wastewater at least 90 percent.

26. The process of claim 15 further comprising:
filtering said wastewater subsequent to said admixing with said reducing agent.

27. A process for reducing a color value of a wastewater containing a soluble organic dye, said process comprises:
adjusting said wastewater to a pH of about 2.0 to about 6.9;
admixing a sufficient quantity of a cationic flocculant from a quaternary ammonium condensation polymer to form a floc in said pH adjusted wastewater with said soluble organic dye;
admixing a reducing agent into said flocculated wastewater in an amount sufficient to attain an oxidation-reduction potential end of point of at least −200, said admixing of said reducing agent being performed in one of two conditions, said two conditions being as follows:
a first condition wherein said reducing agent is a member selected from the group consisting of an alkali metal hydrosulfite, an alkaline earth hydrosulfite, and mixtures of these; and
a second condition wherein said reducing agent is a combination of:
a member selected from the group consisting of an alkali metal bisulfite , an alkaline earth bisulfite, and mixtures of these; and
an alkali metal borohydride, said alkali metal borohydride being a member selected from the group consisting of lithium borohydride, sodium borohydride, potassium borohydride, and mixtures of these; and
separating said flocculated soluble organic dye from said wastewater.

28. The process of claim 27, wherein said cationic flocculant is a condensation polymer of epichlorohydrin, dimethylamine, and ethylenediamine.

29. The process of claim 27, wherein said reducing agent is sodium hydrosulfite.

30. The process of claim 27, wherein said reducing agent is a combination of sodium bisulfite and said alkali metal borohydride, said alkali metal borohydride is sodium borohydride.

31. The process of claim 27, wherein said reducing agent is added in a sufficient amount to produce an oxidation-reduction potential of about −500 to −700.

32. The process of claim 27, wherein said reducing agent is added in an amount to provide a concentration of up to 5,500 parts per million in said wastewater.

33. The process of claim 27, wherein said flocculant is added in an amount to provide a concentration of about 50 to 2000 parts per million in said wastewater.

34. A process for reducing a color of a wastewater containing a soluble organic dye, said processing consisting essentially of:
adjusting said wastewater to a pH of about 5.0 to 6.0;
admixing said acidified wastewater with a polymeric quaternary ammonium condensation polymer of epichlorohydrin, diethylamine, and ethylenediamine to form a floc with said soluble organic dye;
admixing said wastewater with at least one reducing agent to produce an oxidation-reduction potential of at least −200, said admixing of said reducing agent being performed in one of two conditions, said two conditions being as follows:
a first condition wherein said reducing agent is a member selected from the group consisting of an alkali metal hydrosulfite, an alkaline earth hydrosulfite, and mixtures of these; and
a second condition wherein said reducing agent is a combination of:
a member selected from the group consisting of an alkali metal bisulfite, an alkaline earth bisulfite, and mixtures of these; and
an alkali metal borohydride, said alkali metal borohydride being a member selected from the group consisting of lithium borohydride, sodium borohydride, potassium borohydride, and mixtures of these; and
separating said flocculated soluble organic dye from said wastewater.

35. The process of claim 34, wherein the step of admixing said flocculant is in an amount to provide a concentration of about 50 to 3,000 parts per million in said wastewater.

36. The process of claim 35, wherein the step of admixing said flocculant is in the amount to provide a concentration of about 1000 to 2,000 parts per million in said wastewater.

37. The process of claim 34, wherein the step of admixing said reducing agent is in an amount to provide a concentration of up to 5,500 parts per million in said wastewater.

38. The process of claim 34, wherein said reducing agent is sodium hydrosulfite.

39. The process of claim 34, wherein said reducing agent is a combination of sodium bisulfite and a member selected from the group consisting of sodium borohydride, lithium borohydride, potassium borohydride, and mixtures of these.

40. The process of claim 39, wherein said reducing agent is added in a sufficient amount to provide said wastewater with an oxidation-reduction potential of −400 to −800.

* * * * *